United States Patent [19]
Wilkinson

[11] Patent Number: 5,836,495
[45] Date of Patent: Nov. 17, 1998

[54] AUTOMATIVE VEHICLE LIFT MECHANISM ADAPTED FOR TWO-WHEELED VEHICLES

[76] Inventor: James D. Wilkinson, 5439 Ontario Center Rd., Ontario, N.Y. 14519

[21] Appl. No.: 867,591

[22] Filed: Jun. 2, 1997

[51] Int. Cl.⁶ ........................................ B60R 9/10
[52] U.S. Cl. .......................... 224/537; 224/924; 280/495
[58] Field of Search ........................... 280/495; 224/488, 224/571, 537, 924, 521, 518, 502, 509, 514, 515; 414/462; 211/17, 20, 22, 23, 24; 70/258, 14, 19

[56] References Cited

U.S. PATENT DOCUMENTS

| | | | |
|---|---|---|---|
| 1,386,543 | 8/1921 | Tiller | 70/14 |
| 3,912,098 | 10/1975 | Nicotra | 214/450 |
| 4,275,981 | 6/1981 | Bruhn | 414/462 |
| 4,318,501 | 3/1982 | Graber | 224/42.03 |
| 4,815,638 | 3/1989 | Hutyra | 224/42.03 |
| 5,129,559 | 7/1992 | Holliday | 224/42.03 |
| 5,377,886 | 1/1995 | Sickler | 224/42.45 |
| 5,456,564 | 10/1995 | Bianchini | 414/462 |
| 5,549,231 | 8/1996 | Fletcher et al. | 224/536 |
| 5,699,985 | 12/1997 | Vogel | 224/564 |

*Primary Examiner*—Brian L. Johnson
*Assistant Examiner*—Michael Cuff
*Attorney, Agent, or Firm*—Robert J. Bird

[57] ABSTRACT

An automotive wheel lift is adapted to carry a motorcycle by wheel pads removably mounted on the wheel lift crossbar. Each wheel pad includes an inverted crossbar channel for placement over the crossbar, an upright wheel channel parallel with the crossbar channel, and a lock bar for removable placement under the crossbar to alternatively lock the wheel pad to the crossbar or to release it from the crossbar. Tie down straps from the ends of the lock bars help secure a motorcycle in standing position.

2 Claims, 2 Drawing Sheets

AUTOMATIVE VEHICLE LIFT MECHANISM ADAPTED FOR TWO-WHEELED VEHICLES

BACKGROUND OF THE INVENTION

This invention is a wheel lift for transporting a motorcycle or the like.

Tow trucks and flatbed trucks are in general use for towing or transporting automobiles. An automoble under tow retains a stable upright attitude because its two rear wheels remain on the ground. An automobile on the back of a flatbed truck is stable because it rests squarely on all four wheels.

A two wheeled vehicle such as a motorcycle is not readily "towed" by a tow truck, or transported on a flatbed. Tow trucks and flatbeds are not adapted for use with motorcycles. Just getting a motorcycle onto a flatbed, such as by winching or driving it up a ramp, is a dangerous undertaking. Then, when the motorcycle is up on the flatbed, it must be held upright or otherwise secured, and a flatbed does not include appropriate fixtures or equipment for that purpose.

SUMMARY OF THE INVENTION

According to this invention, an automotive wheel lift is adapted to carry a motorcycle. Wheel pads are removably mounted on the wheel lift crossbar. Each wheel pad includes an inverted crossbar channel for placement over the crossbar, an upright wheel channel parallel with the crossbar channel, and a lock bar for removable placement under the crossbar to alternatively lock the wheel pad to the crossbar or to release it from the crossbar. Tie down straps from the ends of the lock bars help to secure a motorcycle in standing position on the wheel pads.

DRAWING

DESCRIPTION

Figure 1:
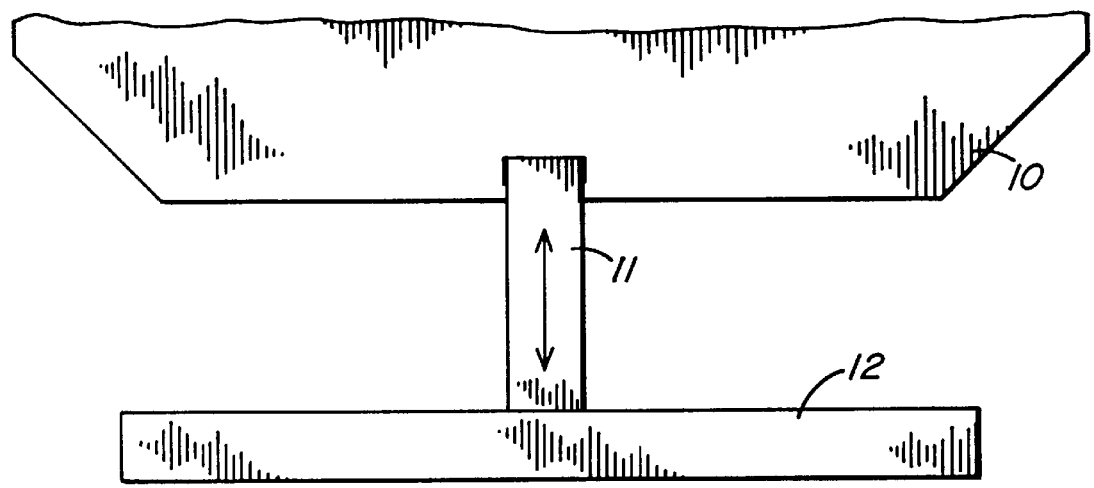
FIG. 1 is a top view of a wheel lift mechanism extending from the back of a tow truck.

Referring now to the drawing, FIG. 1 represents a top view of a wheel lift mechanism extending from the back of a tow truck 10. The wheel lift mechanism includes a longitudinal column 11 extending lengthwise of the tow truck 10, and a transverse crossbar 12 across the end of the column 11. The column 11 is movable forward and rearward relative to the truck 10 as indicated by the arrow. A standard wheel lift of the prior art includes forward-directed wheel pads (not shown) on its crossbar on which to lift the front wheels of an automobile.

Figure 2:
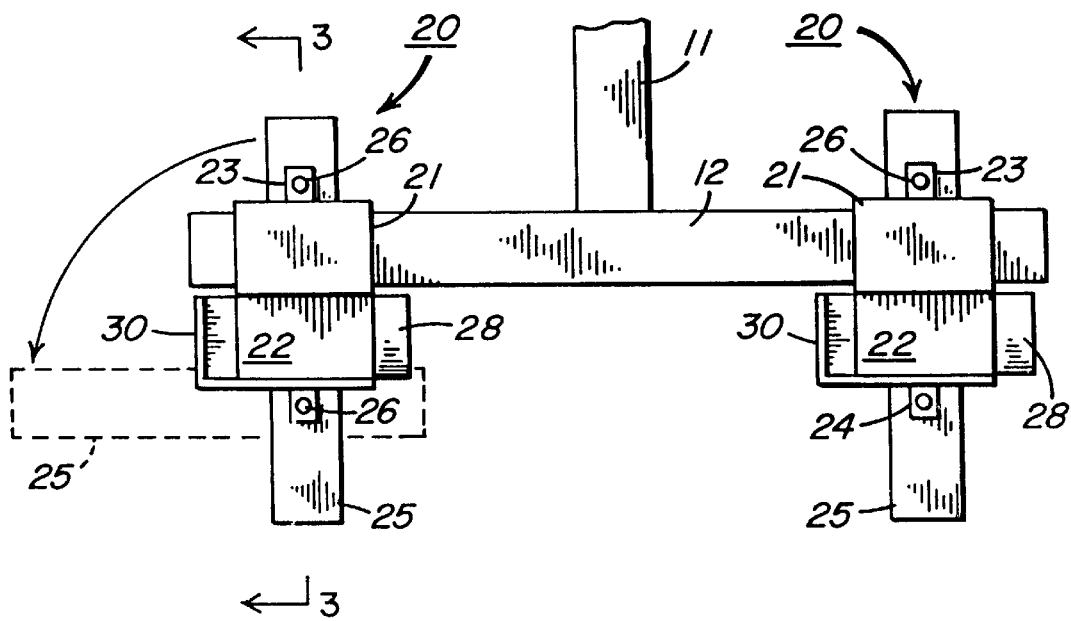
FIG. 2 is a view similar to FIG. 1, with the addition of wheel pads of this invention.
Figure 3:
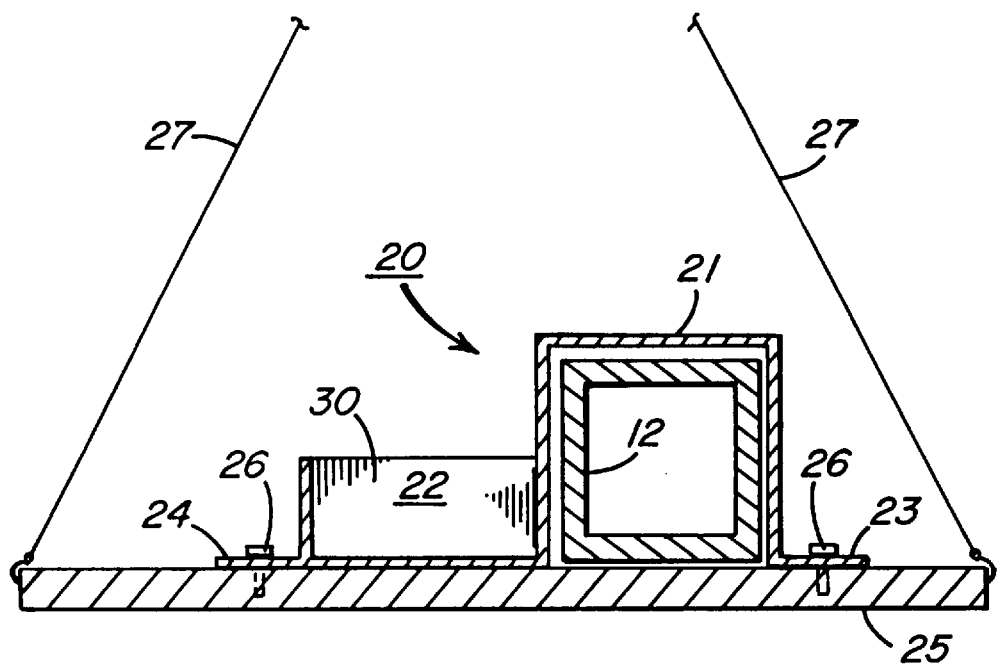
FIG. 3 is an enlarged sectional elevation on the plane 3—3 of FIG. 2.
Figure 4:
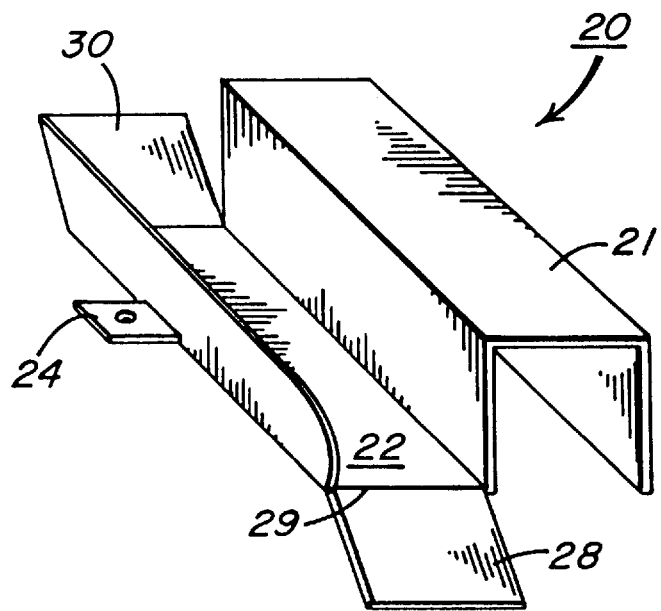
FIG. 4 is a pictorial view of a wheel pad according to this invention.

Reference is now to FIGS. 2, 3 and 4. In FIG. 2, the crossbar 12 has left and right wheel pads 20 mounted on it. Each wheel pad 20 includes an inverted crossbar channel 21 combined with an upright wheel channel 22. The crossbar channel 21 fits over the crossbar 12. The wheel channel 22, parallel with the crossbar channel 21, is a channel for one wheel of a motorcycle. Wheel pads 20 further include front and rear flanges 23, 24, each including a bolthole.

With the crossbar channel 21 mounted over the crossbar 12, a lock bar 25 extends under the crossbar 12 and is bolted to the flanges 23, 24 by bolts 26 to secure the wheel pad 20 to the crossbar 12. This is the locked position shown in solid lines in FIGS. 2 and 3. With removal of the bolt 26 at the front flange 23, the lock bar 25 is pivotally movable in a horizontal plane from its locked position to an unlocked position represented by dashed lines (FIG. 2). In its unlocked position, the lock bar 25 is free of the crossbar 12 and the wheel pad 20 is freely removed from (or placed on) the crossbar 12. With removal of bolts 26 at both front and rear flanges the lock bar 25 can, instead of being swung or pivoted out of the way, be entirely removed.

Tie down straps 27 are removably connected to the ends of the lock bar 25. These are for attachment to the upper structure of a motorcycle when one is in place in the wheel pad 20.

FIG. 4 is a pictorial view of a wheel pad 20, and shows a ramp 28 connected at one end of the wheel channel 22 by a hinge connection 29, and a fixed end wall 30 at the other end of the wheel channel 22.

The wheel pads 20 are made of steel plate. They are more substantial than they appear in the drawing. The drawing itself is not to scale, and is simplified to more clearly reveal the essential structure and operation of the invention.

The foregoing description of a preferred embodiment of this invention, including any dimensions, angles, or proportions, is intended as illustrative. The concept and scope of the invention are limited only by the following claims and equivalents thereof.

What is claimed is:

1. A wheel pad for removable placement on the crossbar of a wheel lift mechanism, said wheel pad including:

an inverted crossbar channel for placement over said crossbar, and an upright wheel channel parallel with said crossbar channel;

a lock bar adapted for removable placement under said crossbar to alternatively secure said wheel pad to said crossbar and release said wheel pad from said crossbar;

a front flange forward of said crossbar channel and a rear flange rearward of said wheel channel for releasable bolted connection to said lock bar to permit horizontal pivotal movement of said lock bar between locked and unlocked positions thereof.

2. A wheel lift mechanism including a longitudinal column, a transverse crossbar, and left and right wheel pads each including:

an inverted crossbar channel for placement over said crossbar, and an upright wheel channel parallel with said crossbar channel;

a lock bar adapted for removable placement under said crossbar to alternatively secure said wheel pad to said crossbar and release said wheel pad from said crossbar;

a front flange forward of said crossbar channel and a rear flange rearward of said wheel channel for releasable bolted connection to said lock bar to permit horizontal pivotal movement of said lock bar between locked and unlocked positions thereof.

* * * * *